United States Patent
McNichols et al.

(10) Patent No.: US 11,528,837 B2
(45) Date of Patent: Dec. 20, 2022

(54) REAL-TIME AGRICULTURAL RECOMMENDATIONS USING WEATHER SENSING ON EQUIPMENT

(71) Applicant: CLIMATE LLC, San Francisco, CA (US)

(72) Inventors: John McNichols, Ballwin, MO (US); Atif Khan, St. Louis, MO (US); Sourindu Chatterjee, Maryland Heights, MO (US); Mark Ehrhardt, St. Louis, MO (US); Christopher Goodman, St. Louis, MO (US)

(73) Assignee: CLIMATE LLC, San Francisco, CA (US)

( * ) Notice: Subject to any disclaimer, the term of this patent is extended or adjusted under 35 U.S.C. 154(b) by 250 days.

(21) Appl. No.: 16/811,268

(22) Filed: Mar. 6, 2020

(65) Prior Publication Data
US 2020/0281110 A1 Sep. 10, 2020

Related U.S. Application Data

(60) Provisional application No. 62/815,948, filed on Mar. 8, 2019.

(51) Int. Cl.
*G01C 22/00* (2006.01)
*G05D 1/00* (2006.01)
(Continued)

(52) U.S. Cl.
CPC .......... *A01B 79/005* (2013.01); *G05D 1/0088* (2013.01); *G06N 5/02* (2013.01);
(Continued)

(58) Field of Classification Search
CPC ...... A01B 79/005; G05D 1/0088; G06N 5/02; G06N 5/04; G06N 20/00; G01S 19/42; G01W 1/00
(Continued)

(56) References Cited

U.S. PATENT DOCUMENTS

| 6,216,614 | B1 * | 4/2001 | Wollenhaupt | ........ G05D 1/0274 111/900 |
| 2009/0192654 | A1 | 7/2009 | Wendte et al. | |

(Continued)

OTHER PUBLICATIONS

The International Searching Authority, "Search Report" in application No. PCT/US202/021644, dated Jun. 16, 2020, 17 pages.
(Continued)

*Primary Examiner* — Mahmoud S Ismail
(74) *Attorney, Agent, or Firm* — Harness, Dickey & Pierce, P.L.C.

(57) ABSTRACT

An agricultural apparatus operable in agricultural fields includes one or more digital electronic weather stations affixed to the apparatus and optionally one or more GPS receivers and/or proximity sensors, each coupled to a mobile computing device such as a cab computer. The weather stations transmit data representing wind speed, temperature and/or other weather parameters, as measured on the apparatus, to the mobile computing device. Under control of program logic, the mobile computing device continuously compares real-time, then-current weather data received from the weather stations to programmed or configured threshold values relating to a current agricultural operation. If the weather data indicates weather conditions that exceed one of the thresholds, a warning message may be generated at the mobile computing device to prompt the operator to confirm whether to continue the operation.

20 Claims, 16 Drawing Sheets

(51) Int. Cl.
*A01B 79/00* (2006.01)
*G06N 5/04* (2006.01)
*G06N 5/02* (2006.01)
*G01W 1/00* (2006.01)
*G06N 20/00* (2019.01)
*G01S 19/42* (2010.01)

(52) U.S. Cl.
CPC ............... *G06N 5/04* (2013.01); *G01S 19/42* (2013.01); *G01W 1/00* (2013.01); *G06N 20/00* (2019.01)

(58) Field of Classification Search
USPC .......................................................... 701/23
See application file for complete search history.

(56) References Cited

U.S. PATENT DOCUMENTS

| | | | |
|---|---|---|---|
| 2014/0316692 A1* | 10/2014 | Hillger | G01C 21/20 701/408 |
| 2015/0373905 A1 | 12/2015 | Anderson et al. | |
| 2016/0232621 A1 | 8/2016 | Ethington et al. | |
| 2016/0308954 A1* | 10/2016 | Wilbur | H04L 67/18 |
| 2016/0309659 A1* | 10/2016 | Guy | A01G 25/16 |
| 2017/0027103 A1* | 2/2017 | Grotelueschen | A01C 23/008 |

OTHER PUBLICATIONS

Current Claims in Application No. PCT/US2020/021644, dated Jun. 2020.

* cited by examiner

200 Mobile Computer Application

- 208 Seeds and Planting Instructions
- 210 Nitrogen Instructions
- 212 Weather Instructions
- 214 Field Health Instructions
- 216 Performance Instructions 206 Digital Map Book 205 Script Generation Instructions 204 Overview and Alert Instructions 202 Account, Fields, Data Ingestion, Sharing Instructions

(b)

220 Cab Computer Application

- 222 Maps - Cab
- 224 Remote View
- 226 Data Collect and Transfer
- 228 Machine Alerts
- 230 Script Transfer 232 Scouting - Cab

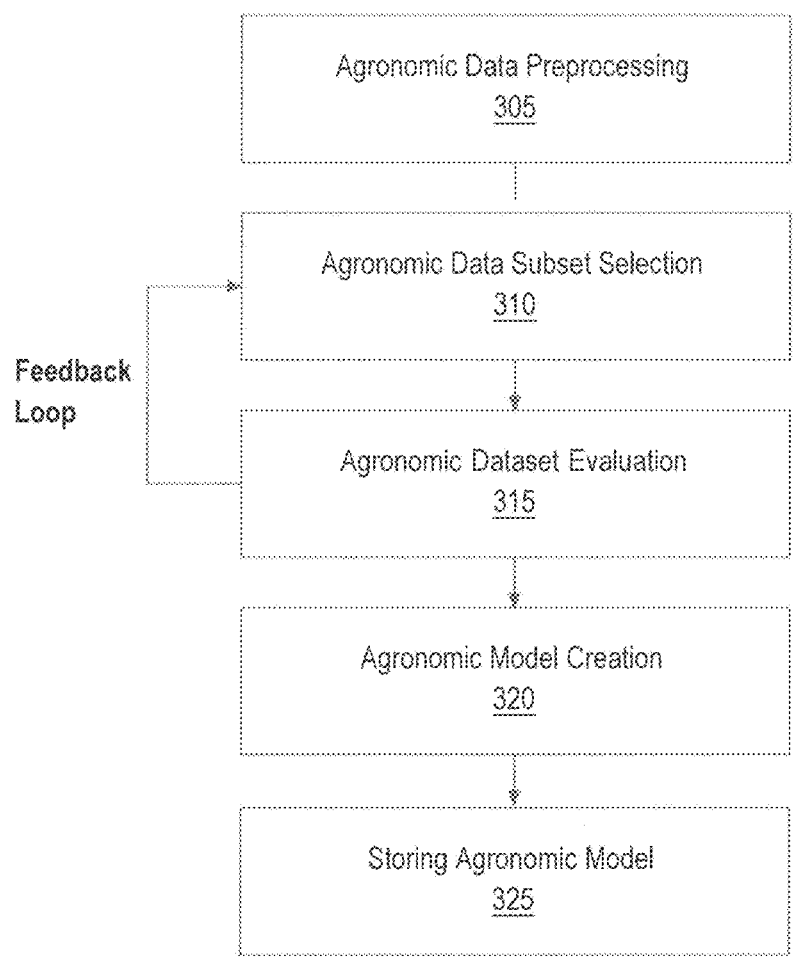

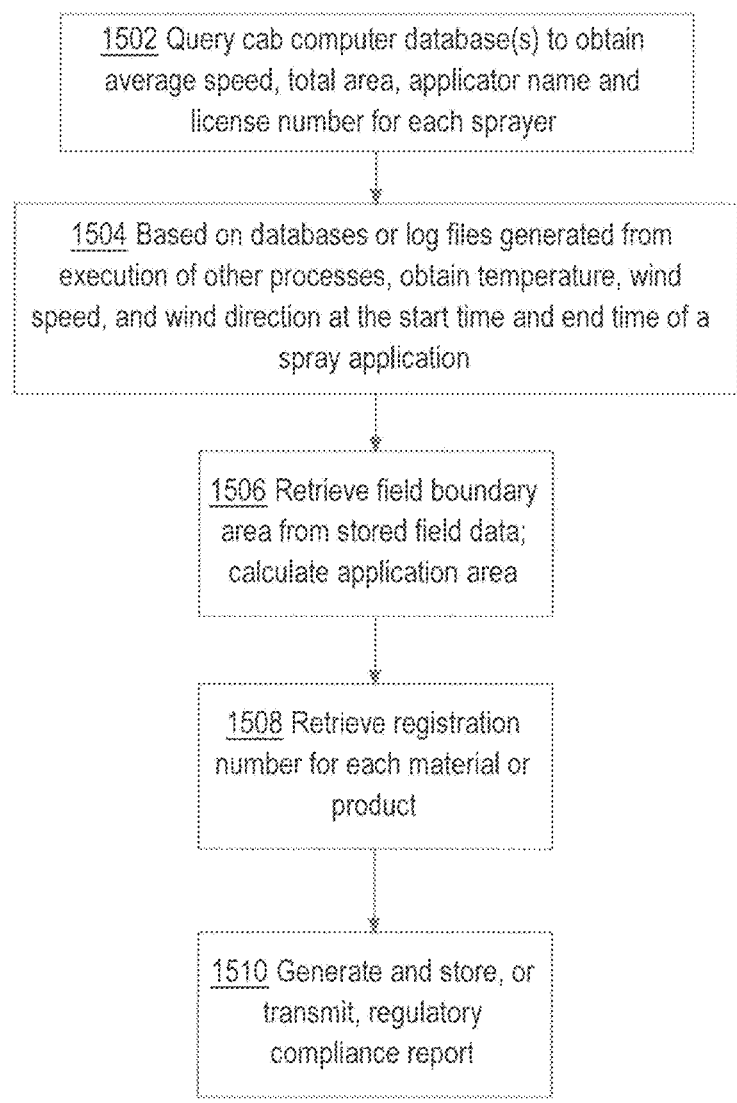

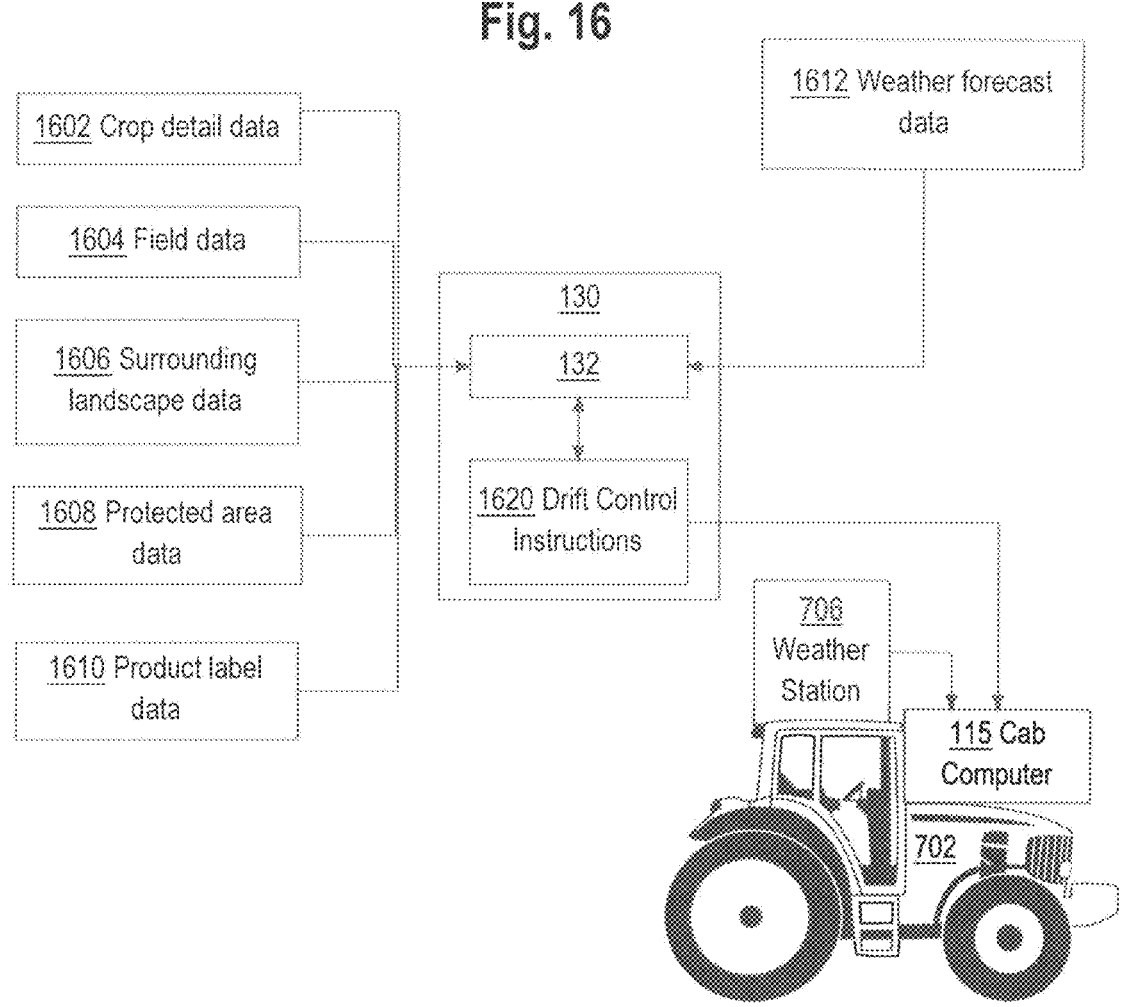

REAL-TIME AGRICULTURAL RECOMMENDATIONS USING WEATHER SENSING ON EQUIPMENT

CROSS-REFERENCE TO RELATED APPLICATIONS; BENEFIT CLAIM

This application claims the benefit of application 62/815,948, filed Mar. 8, 2019, the entire contents of which are hereby incorporated by reference for all purposes as if fully set forth herein, under 35 U.S.C. § 119(e).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

One technical field of the present disclosure is computer-implemented agricultural data processing. Another technical field is computer-implemented collection of real-time localized weather data and use of the weather data in agricultural operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many agricultural operations are performed outdoors in fields and may be significantly affected by local weather conditions. Examples of operations include spraying, sidedressing and seeding. For these operations, wind and precipitation conditions in the field may determine whether the operations can be performed and whether adverse effects will occur, such as seed drift, spray drift or inadequate application of materials to crops. Most weather data available to growers is collected on a regional basis and consists of forecasts. This data is not sufficiently reliable to determine whether an operation can start, or whether an ongoing operation is occurring under optimal conditions.

Manufacturers of certain sprayed products such as pest treatments or herbicides provide product labels that define recommended conditions for applying the products. Product labels often specify maximum allowable wind speed to avoid drift or misapplication, as well as recommended nozzle pressure, spray volume, height from the crop canopy or other factors that can affect the effectiveness of the product.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 3 illustrates a programmed process by which the agricultural intelligence computer system generates one or more preconfigured agronomic models using agronomic data provided by one or more data sources.

FIG. 15 illustrates an example computer-implemented process of automatically generating regulatory reports relating to completed agricultural operations.

FIG. 16 illustrates an integrated data processing system programmed to provide automatic drift control for agricultural apparatus when operating in fields based on local real-time weather data.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. EXAMPLE SYSTEMS FOR INTEGRATION OF LOCAL REAL-TIME WEATHER DATA IN AGRICULTURAL OPERATIONS
   3.1 EXAMPLE HARDWARE AND SOFTWARE CONFIGURATIONS
   3.2 EXAMPLE OPERATOR DISPLAY UPDATES
   3.3 AUTOMATICALLY MONITORING EFFECTIVENESS OF OPERATIONS
   3.4 AUTOMATED CREATION OF FIELD BUFFER ZONES
   3.5 AUTOMATED GENERATION OF REGULATORY REPORTS
   3.6 AUTOMATED DRIFT MANAGEMENT
4. PRACTICAL APPLICATIONS
5. BENEFITS OF CERTAIN EMBODIMENTS

1. GENERAL OVERVIEW

In an embodiment, agricultural apparatus operable in agricultural fields comprises one or more digital electronic weather stations affixed to the apparatus and optionally one or more GPS receivers and/or proximity sensors, each coupled to a mobile computing device such as a cab computer. The weather stations transmit data representing wind speed, temperature and/or other weather parameters, as measured on the apparatus, to the mobile computing device. Under control of program logic, the mobile computing device continuously compares real-time, then-current weather data received from the weather stations to programmed or configured threshold values relating to a current agricultural operation. If the weather data indicates weather conditions that exceed one of the thresholds, a warning message may be generated at the mobile computing device to prompt the operator to confirm whether to continue the operation. Post-operation wind maps support assessment of the effectiveness of the operation. Other embodiments can provide continuous monitoring of spray effectiveness, automated creation of field buffer zones to prevent application of products under conditions that will adversely affect adjacent crops or fields, automated generation of regulatory reports and automatic drift management.

2. EXAMPLE AGRICULTURAL INTELLIGENCE COMPUTER SYSTEM 2.1 Structural Overview

Figure 1:
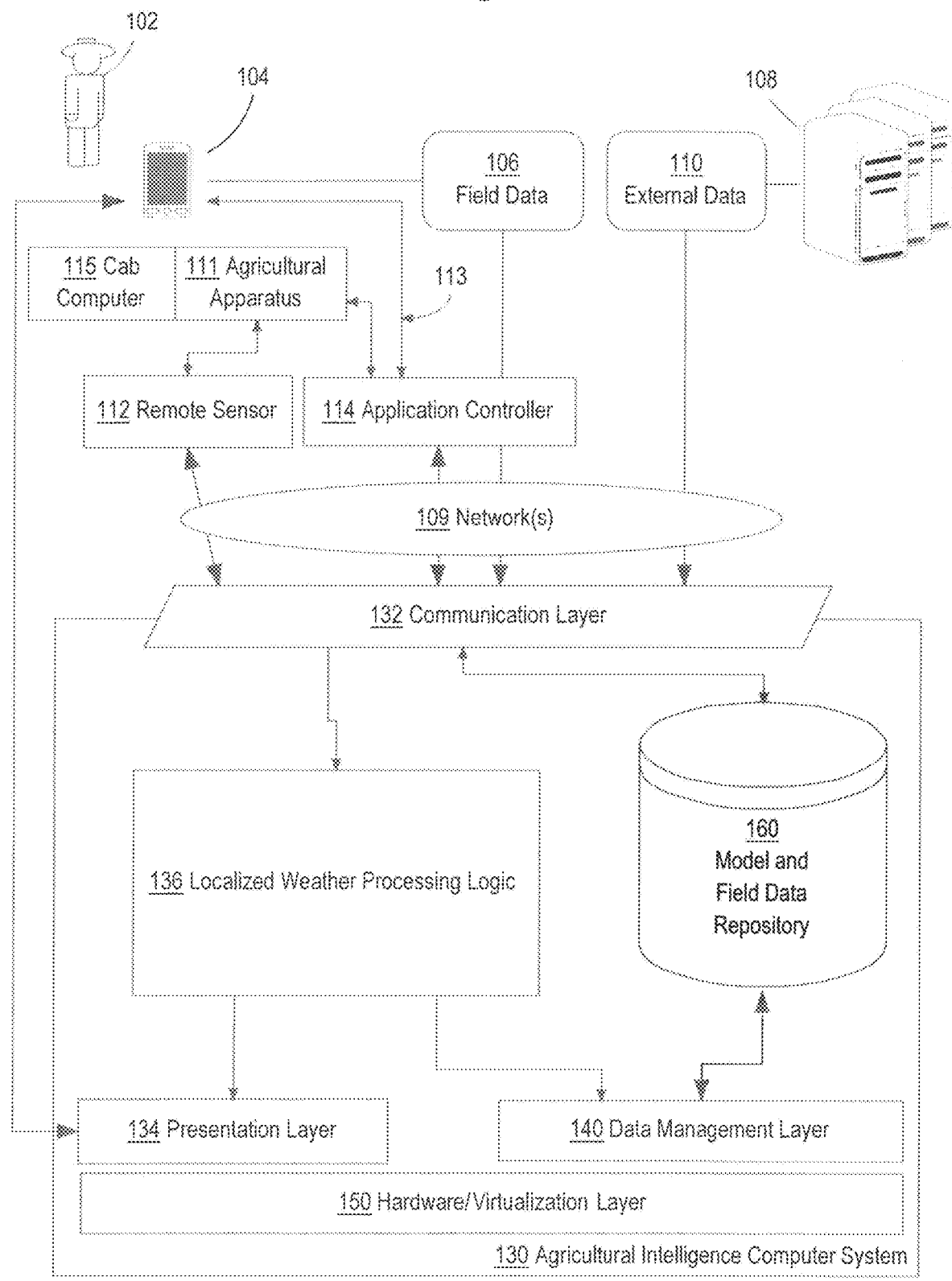
FIG. 1 illustrates an example computer system that is configured to perform the functions described herein, shown in a field environment with other apparatus with which the system may interoperate.

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
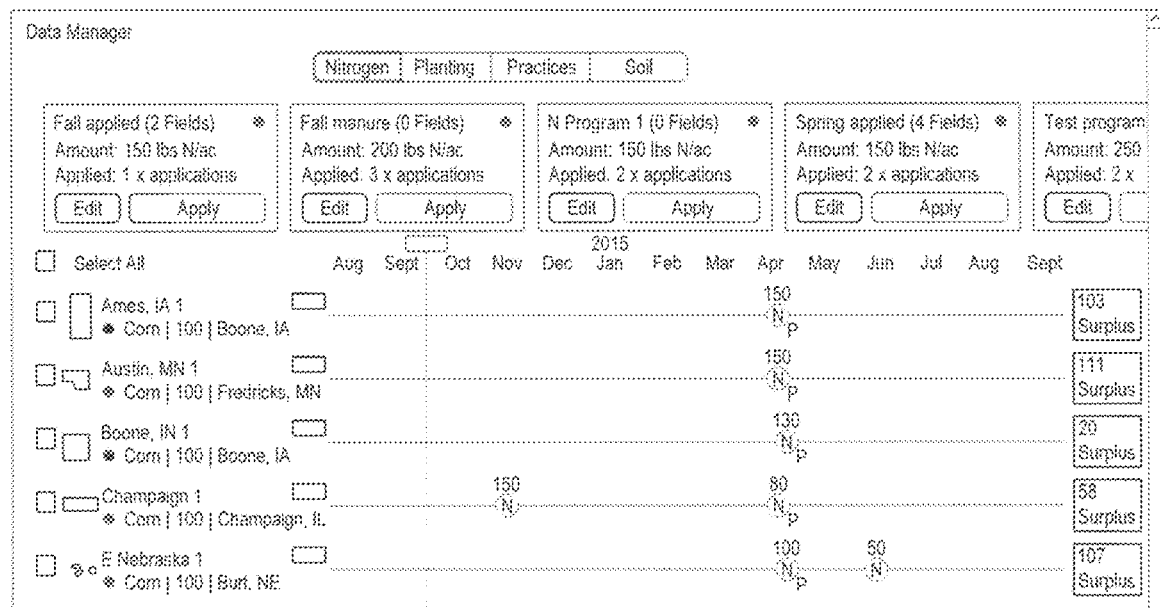
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

Figure 6:
FIG. 6 depicts an example embodiment of a spreadsheet view for data entry.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of the communication layer 132, presentation layer 134, localized weather processing logic 136 and data management layer 140 comprises a set of one or more pages of main memory, such as RAM, in the agricultural intelligence computer system 130 into which executable instructions have been loaded and which when executed cause the agricultural intelligence computer system to perform certain functions or operations that are described herein with reference to those modules. For example, localized weather processing logic is programmed to perform cloud-based processing of localized real-time weather data that is collected during agricultural operations and useful for upstream processing such as report generation, generating digital field maps showing wind drift, automated drift management calculations based upon integration of field data, landscape data, protected area data, cloud-based weather data and label data, international weather datasets and similar applications. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of communication layer 132, presentation layer 134, localized weather processing logic 136 and data management layer 140 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
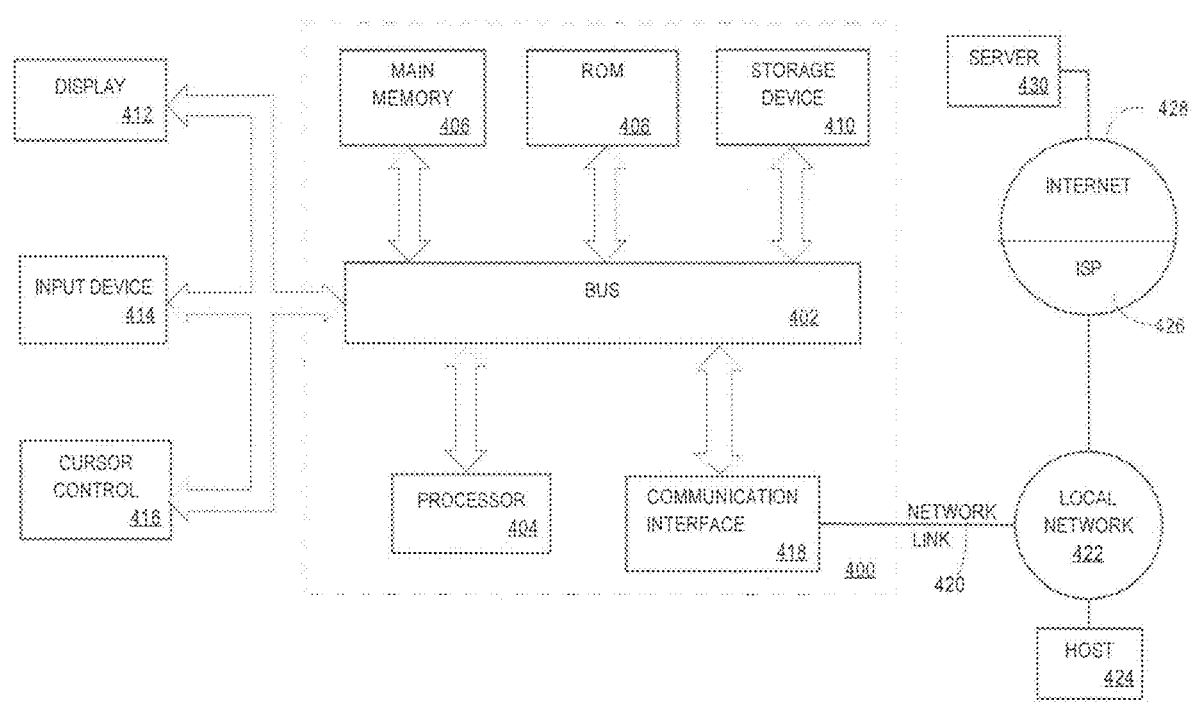
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. EXAMPLE SYSTEMS FOR INTEGRATION OF LOCAL REAL-TIME WEATHER DATA IN AGRICULTURAL OPERATIONS

3.1 Example Hardware and Software Configurations

Figure 7:
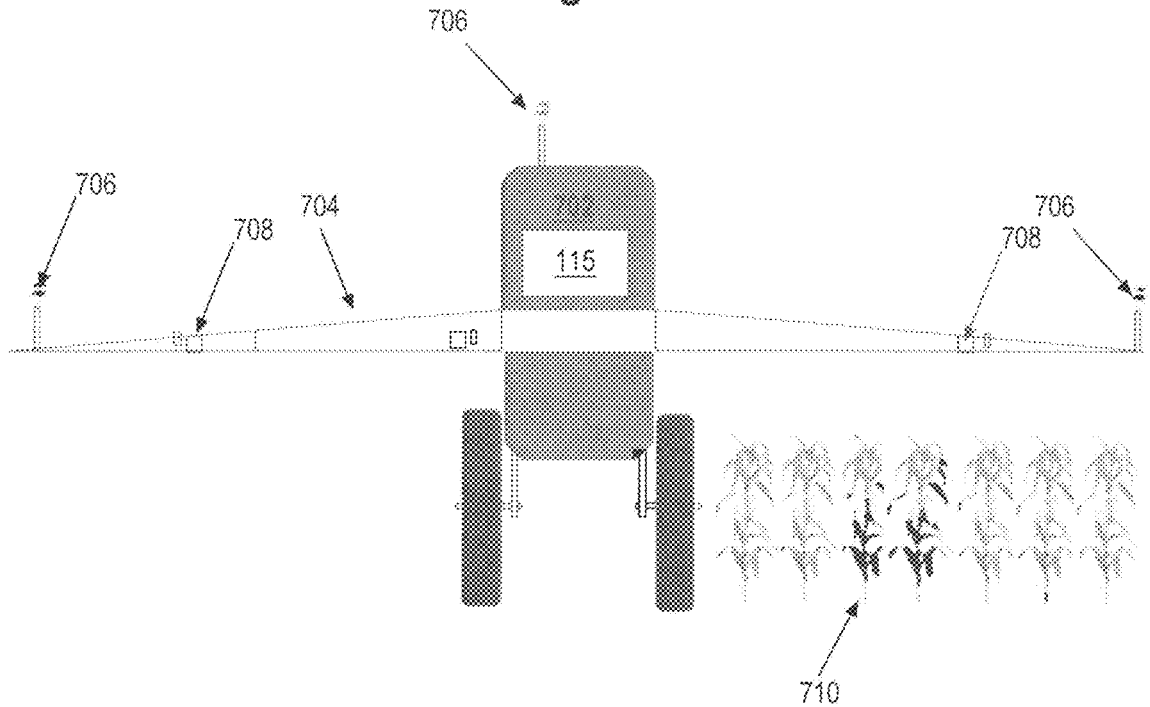
FIG. 7 is a simplified end elevation view of agricultural apparatus comprising a tractor with a spray boom in an agricultural field illustrating a plurality of weather stations and proximity sensors affixed to the apparatus.
Figure 8:
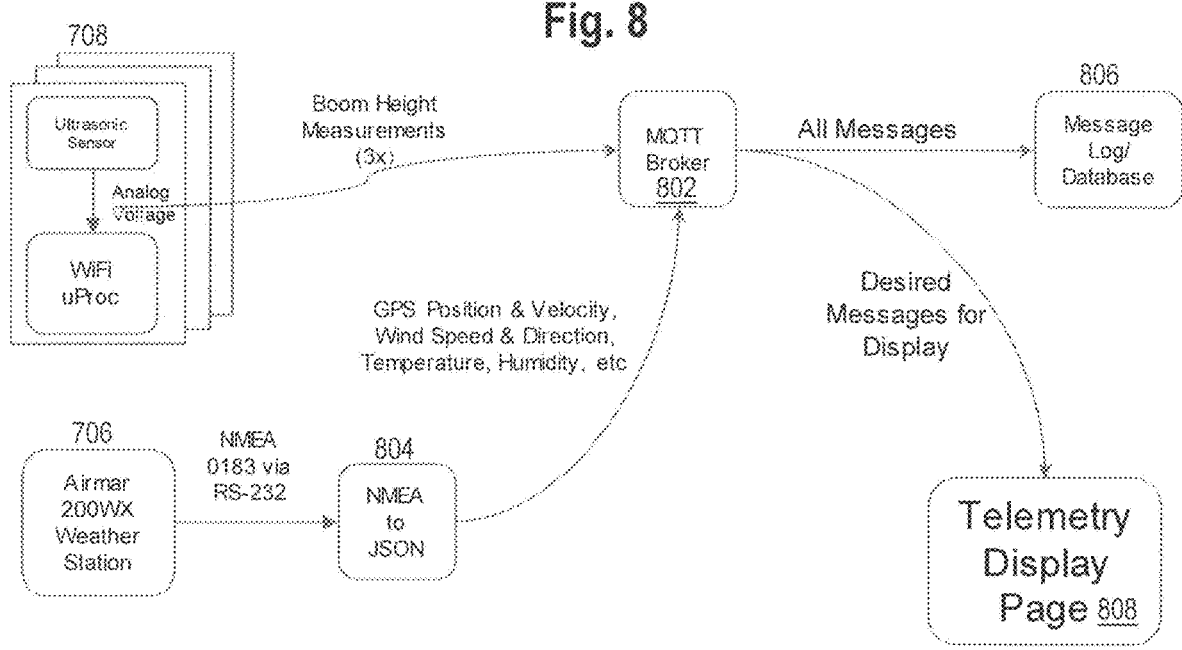
FIG. 8 is a simplified data flow diagram of functional elements of a distributed electronic system for collecting weather data and proximity data on agricultural apparatus.
Figure 9:
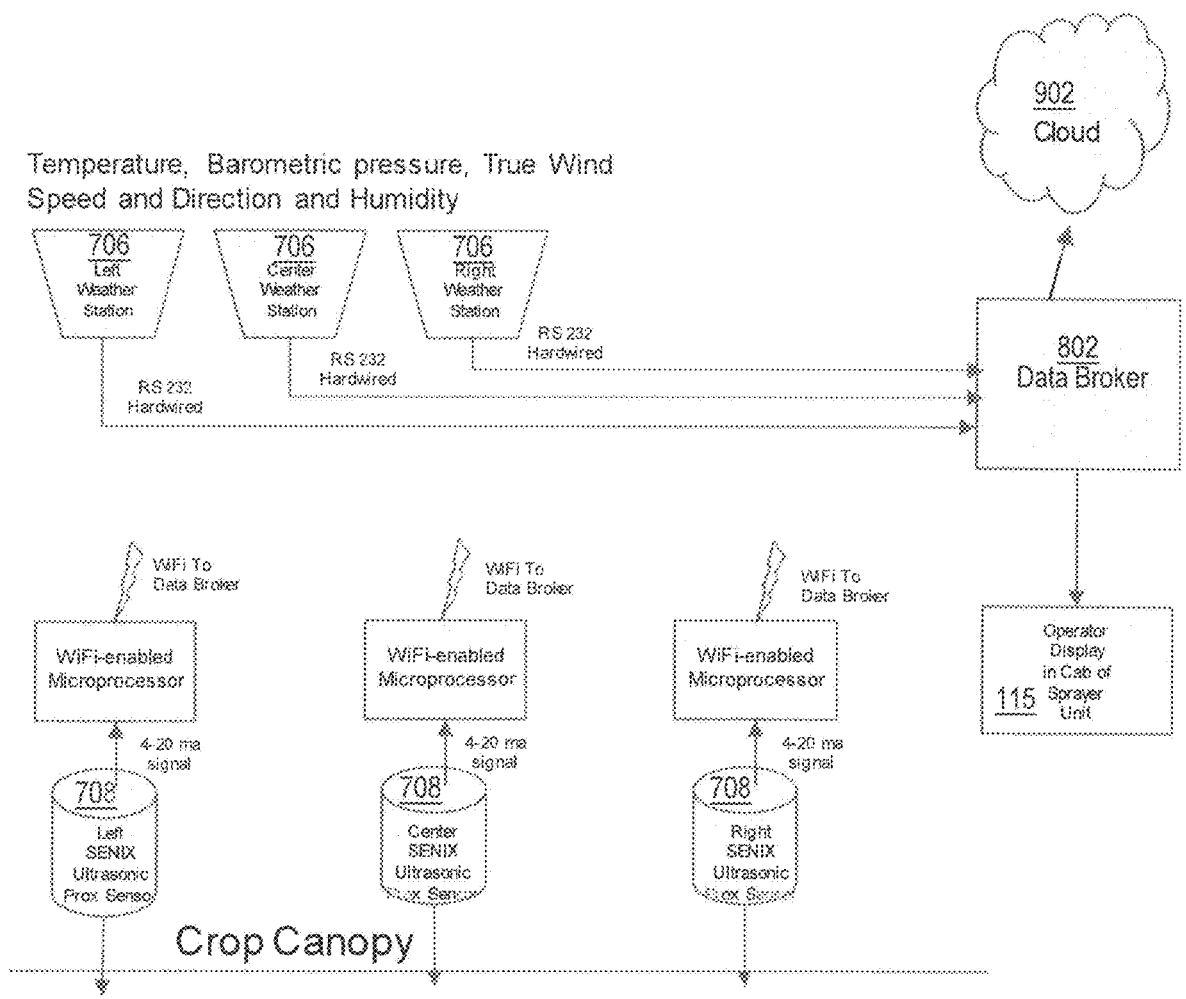
FIG. 9 is a simplified hardware architecture diagram of functional elements of a distributed electronic system for collecting weather data and proximity data on agricultural apparatus.

FIG. 7 is a simplified end elevation view of agricultural apparatus comprising a tractor with a spray boom in an agricultural field illustrating a plurality of weather stations and proximity sensors affixed to the apparatus. FIG. 8 is a simplified data flow diagram of functional elements of a distributed electronic system for collecting weather data and proximity data on agricultural apparatus. FIG. 9 is a simplified hardware architecture diagram of functional elements of a distributed electronic system for collecting weather data and proximity data on agricultural apparatus. Referring first to FIG. 7, in one embodiment, agricultural apparatus 702 such as a tractor may comprise an implement 704 such as a spray boom. A plurality of digital electronic weather stations 706 are affixed to the apparatus 702 and/or implement 704. The location at which the weather stations 706 are affixed to the apparatus 702 is not critical but is normally selected as a location that is free of wind deflection or other interference effects of the apparatus; for example, rooftop mounting on the cab of the apparatus and mounting at ends of the implement are appropriate. While FIG. 7 shows three (3) weather stations for purposes of illustrating a clear example, in other embodiments fewer or more weather stations may be used. A plurality of proximity sensors 708 optionally are affixed to the implement 704 in cases in which a distance of the implement to crops 710 may be important for proper completion of an agricultural operation. While FIG. 7 shows three (3) proximity sensors for purposes of illustrating a clear example, in other embodiments fewer or more sensors may be used.

In an embodiment, each of the weather stations 706 comprises one or more of a processor or microcontroller, memory, data communication interface, digital thermometer, anemometer, rain gauge, humidity sensor and/or other sensors for other weather parameters. In some embodiments, weather stations 706 comprise a GPS receiver that is capable of receiving signals from Global Positioning System satellites in the sky over or within range of the apparatus 702 and transforming the signals into latitude-longitude values or other geo-location data indicating a then-current geographical location of the apparatus. In other embodiments, a GPS receiver may be integrated into or coupled to cab computer 115 separate from the weather stations 706. The data communication interface of the weather stations 706 may comprise a serial port that is coupled via a wired cable to a cab computer 115 in or on the apparatus 702. The weather stations 706 may be programmed to continuously or periodically transmit data messages that contain digital values representing geo-location, temperature, wind speed, wind direction, barometric pressure, precipitation amount, humidity and/or other weather parameters to the cab computer via the data communication interface. The specific weather parameters that are collected and provided to the cab computer may vary in different embodiments and no specific combination of parameters is mandatory. Because the weather stations are on the apparatus 702 and/or implement 704 and move with that hardware during operations in a field, location or environment, the weather parameters represent localized, real-time weather conditions occurring at the apparatus and/or implement 704 as they are operating in the field, other location or environment.

In one embodiment, real-time action refers to the agricultural intelligence computer system executing one or more operations immediately after receiving input from one or more entities, or within a few seconds of receiving the data. For example, executing real-time instructions to compensate for weather conditions in a field may include receiving, by the agricultural intelligence computer system, from a weather station 706, weather data local to a portion of the field. The location of an implement in the field may also be received. Immediately after receiving input, or a few seconds after receiving input, the agricultural intelligence computer system may use the received data to determine one or more portions of the field which are subject to conditions which are not ideal for treatment of a crop canopy. The system may then immediately or shortly thereafter send a warning message to an operator of the implement.

In an embodiment, each of the proximity sensors 708 comprises a microcontroller coupled to an ultrasonic transducer, and a wireless networking interface with antenna. Proximity sensors 708 may be programmed via firmware to emit ultrasound signals toward crops 710, to calculate or detect, via reflection of the signals, a distance of the implement 704 to a top of a canopy of the crops, and to wirelessly transmit messages containing proximity values or proximity data to the cab computer 115, which has a compatible wireless networking interface. In this manner, the cab computer 115 is configured to continuously or periodically receive proximity data from proximity sensors 708 as the apparatus 702 is operating in the field, other location or environment.

Referring now to FIG. 8, a simplified data flow diagram is shown for one embodiment, indicating functional elements of a distributed electronic system for collecting weather data and proximity data on agricultural apparatus. In this embodiment, proximity sensors 708 each comprise an ultrasonic sensor coupled to a WiFi-enabled microprocessor and configured to output an analog voltage representative of height or proximity measurements, which is transmitted to a Message Queuing Telemetry Transport (MQTT) message broker 802. While MQTT is specified in FIG. 8 as an example, other message transport protocols may be used in other embodiments. MQTT broker 802 may execute as a process or thread in cab computer 115 and is programmed to queue messages received from hardware devices such as proximity sensors 708 and weather stations 706 and forward messages under program control to a message log or database 806 and/or to a telemetry display page 808 that may be shown on an in-cab operator display of the cab computer 115. MQTT broker 802 also may be programmed to transmit locally collected weather and proximity data to remote computers or servers using wireless communication protocols, to update cloud-based servers or other remote systems. Also as seen in FIG. 8, weather stations 706 may comprise weather stations that use NMEA 0183 messaging via RS-232 serial connections (i.e. AirMar 200WX), using a CAN bus of the apparatus 702 or using a CAN bus that is independent of the apparatus. Such serial data is coupled to a NMEA-to-JSON translator 804 which packages weather parameters in JSON blobs and transmits MQTT messages carrying the JSON blobs to MQTT broker 802.

Referring now to FIG. 9, an example of a hardware architecture for an embodiment is shown. In this view, weather stations 706 have hard-wired RS-232 serial connections to data broker 802, which is wirelessly coupled to a server computer in a cloud computing center represented by cloud 902, and to an operator display in the cab of the apparatus. Proximity sensors 708 emit ultrasonic signals toward the crop canopy and produce a 4-20 ma analog output signal to a WiFi-enabled microprocessor, which is configured to transmit data wirelessly via WiFi to the data broker 802.

3.2 Example Operator Display Updates

Figure 10:
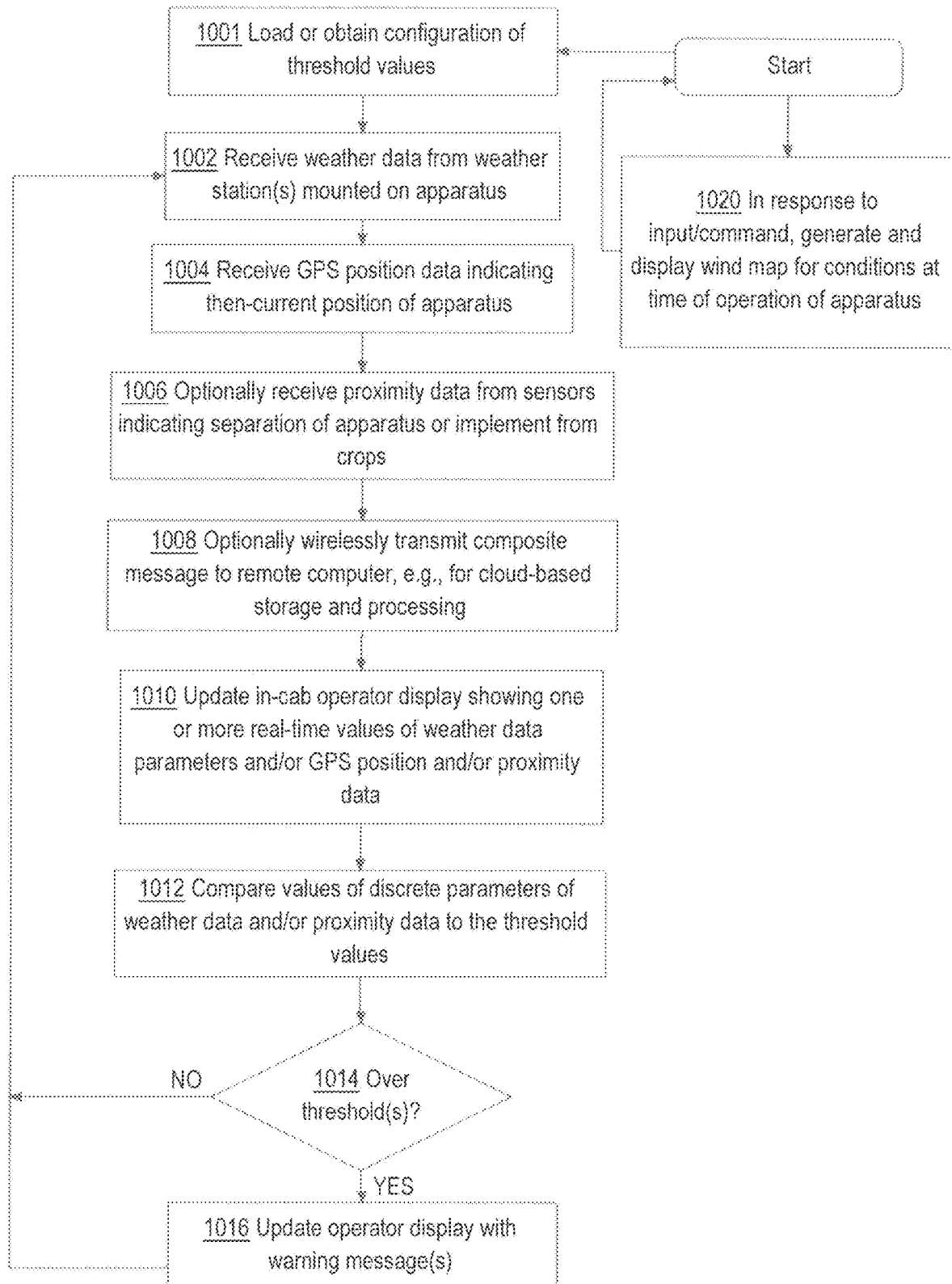
FIG. 10 illustrates an example computer-implemented process of updating an in-cab operator display based on localized collection of real-time weather data.

FIG. 10 illustrates an example computer-implemented process of updating an in-cab operator display based on localized collection of real-time weather data. In an embodiment, after starting execution, at step 1001 the process loads or obtains a configuration of one or more threshold values. In various embodiments, the threshold values are received from an electronic storage attached to apparatus 702. In various embodiments, the threshold values are input manually by a human operator of apparatus 702 or the agricultural intelligence computer system. In various embodiments, the threshold values are received from a cloud-based or remote system storing the threshold values. The threshold values are digitally stored values that represent maximum acceptable conditions for conducting a specified agricultural operation. For example, threshold values may specify maximum recommended wind speed for applying a sprayed product such as an herbicide. Threshold values may specify temperature, humidity or other values. Threshold values may be derived from product label data for agricultural products. Step 1001 may comprise loading threshold values from a configuration value, transmitting a query to a database, scanning a product label or other operations. The specific program or electronic operation that occurs as step 1001 is not critical provided that the cab computer 115, for example, obtains a basis to compare real-time, localized weather parameters to data relating to properly conducting a particular agricultural operation.

At step 1002, the process receives weather data from weather stations mounted on apparatus. For example, cab computer 115 receives a continuous stream of messages from weather stations 706 and/or proximity sensors 708 representing then-current, real-time, localized weather conditions as measured at the apparatus 702 in which the cab computer is mounted. Communication of weather parameters may occur as described herein for FIG. 7, FIG. 8, FIG. 9.

At step 1004, the process receives GPS position data indicating a then-current geographic position of an apparatus having a computer that is executing the process. For example, GPS lat-long data may be received from one of the weather stations 706 or from another GPS receiver.

At step 1006, the process optionally receives proximity data from sensors indicating a separation or distance of the apparatus or an implement from crops in an agricultural field. For example, step 1006 may comprise using proximity sensors to receive a distance of a spray boom from the top of a crop canopy.

At step 1008, the process optionally wirelessly transmits one or more composite messages to a remote computer, such as a cloud-based server, for storage and processing. Step 1008 may comprise periodically packaging the localized, real-time weather parameters that have been received, a timestamp value based on a local system clock of cab computer 115, GPS lat-long values, and/or proximity sensor values and transmitting or uploading that data to a cloud-based server using a wireless network interface. Parameters may include temperature, barometric pressure, true wind speed, true wind direction, relative humidity, sprayer speed, distance from spray boom to soil or crop canopy and so forth. This step facilitates later analysis of data generated in the field as operations are occurring, logging, backup and similar operations.

Figure 11:
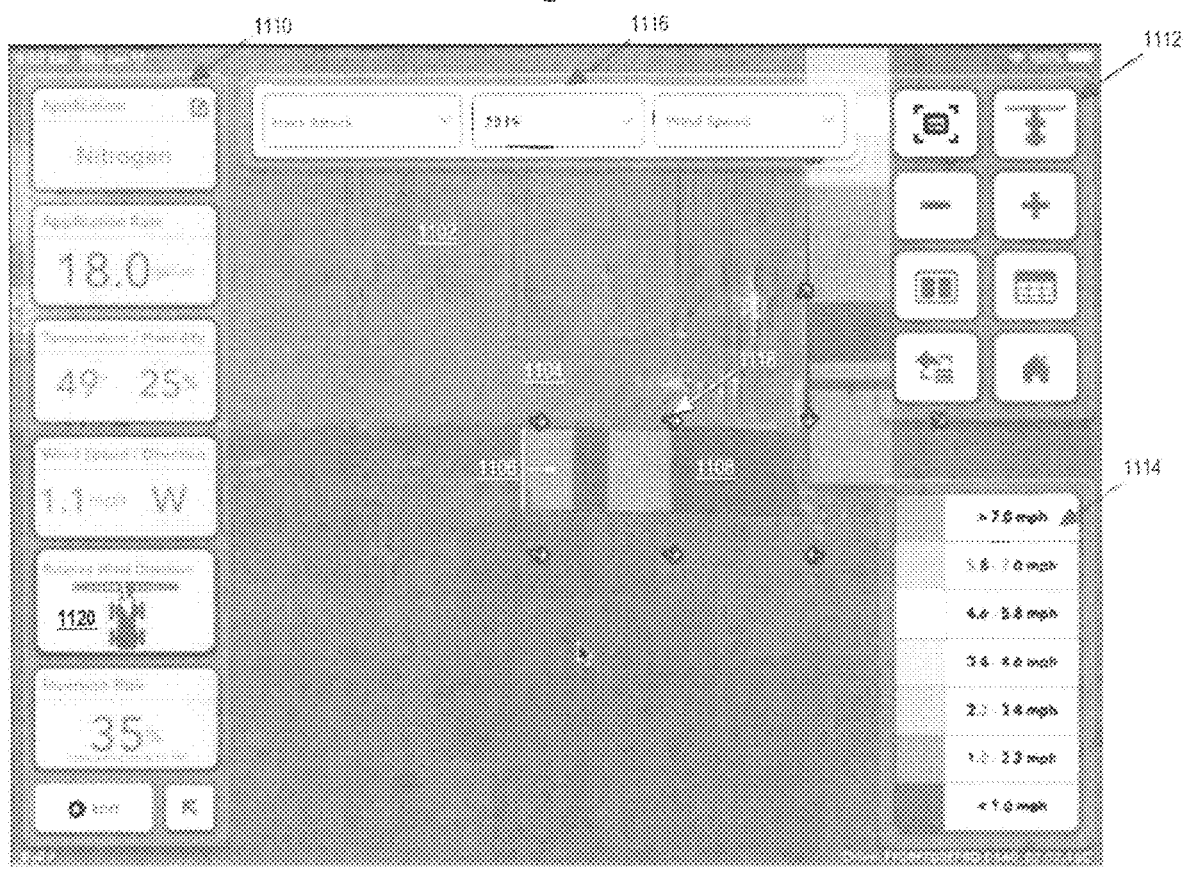
FIG. 11 illustrates an example graphical user interface for a cab computer, generated at the time of an operation, showing areas of a field that a sprayer has covered, wind speed at the time of application, wind direction, temperature, humidity and other data.

At step 1010, the process updates an in-cab operator display showing one or more real-time values of weather data parameters and/or GPS position and/or proximity data. FIG. 11 illustrates an example graphical user interface for a cab computer, generated at the time of an operation, showing areas of a field that a sprayer has covered, wind speed at the time of application, wind direction, temperature, humidity and other data. In an embodiment, cab computer 115 generates and displays a screen display 1102 as seen in FIG. 11 under program control using a touch-screen graphical display device. In an embodiment, screen display 1102 comprises a graphical field display 1104, apparatus icon 1106, pass graphics 1108, parameter panel 1110, tool panel 1112, wind speed legend 1114, view tool 1116 and wind direction indicators 1118. The graphical field display 1104 represents an agricultural field typically based upon satellite or aerial images of the field. The apparatus icon 1106 represents a then-current position of agricultural apparatus 702 within the field; in the example of FIG. 11, the apparatus is moving right to left. The pass graphics 1108 comprise one or more graphical colored polygons representing all or portions of one or more passes of the apparatus 702 in the field; in an embodiment, colors of polygons within a pass represent the wind speed that was measured during the portion of a pass that is represented by a polygon, using colors that correspond to wind speed values shown in the wind speed legend 1114. Furthermore, the dimensions and sizes of polygons within a pass correspond to and are proportional to the actual area of a field that has been traversed by the apparatus 702.

The parameter panel 1110 comprises a plurality of rectangular sub panels each displaying one or more different physical parameters associated with an agricultural operation, weather conditions or the apparatus 702. For example, in FIG. 11 the parameter panel 1110 shows an application type (Nitrogen); application rate value; temperature and humidity values; wind speed and direction value; relative wind direction and inversion risk values. A sub panel 1120 comprises an icon representing the apparatus 702 and an arrow showing the then-current wind direction relative to the apparatus. The configuration of sub panel 1120 enables an operator of the apparatus 702 to see the wind direction as experienced by the operator relative to the direction of travel of the apparatus, rather than in terms of absolute compass heading or direction. In contrast, field display 1104 typically is arranged with compass north at the top and wind direction indicators 1118 indicate the actual wind direction as measured at the time of a particular part of a pass, shown using true compass heading or direction. For this reason, the direction of wind direction indicators in sub panel 1120 and field map 1104 are different.

The tool panel 1112 comprises a plurality of touch-accessible display tools to change the size, scale or zoom level and arrangement of the screen display 1102; for example, legend panels may be turned on and off or changed. The wind speed legend 1114 comprises a color-coded set of wind speed values that may be used to correlate measured wind speed values to the pass graphic 1108. In other embodiments, different kinds of legends for other weather parameters may be displayed and the use of wind speed is not required. For example, display 1102 could show color-coding or pass data in terms of temperature, humidity or another parameter measured at the apparatus 702. The view tool 1116 is programmed to enable an operator to select, by touch input, a particular field name, year of activity, and type of display. In the example of FIG. 11, data for year 2019 and wind speed has been selected. The selection of different values using view tool 1116 would cause cab computer 115 to generate a new form of screen display 1102 and update the display device with the new view.

At step 1012, the process compares values of discrete parameters of the weather data and/or proximity data to the threshold values that were obtained at step 1001. At step 1014, the process tests whether any of the parameters exceed any of the threshold values. If so, then at step 1016 the operator display is updated with one or more warning messages indicating that thresholds have been exceeded, or similar messages. Step 1001, 1012, 1014, 1016 are programmed for generating warning messages to an operator based upon a threshold-crossing algorithm; however, in other embodiments, comparisons other than threshold-crossing may be used to determine when a warning message should be generated. For example, the process could be programmed with rules specifying multiple comparisons of related parameters using any combination of arithmetic operators for the comparisons, IF . . . THEN relationships and so forth.

Figure 12:
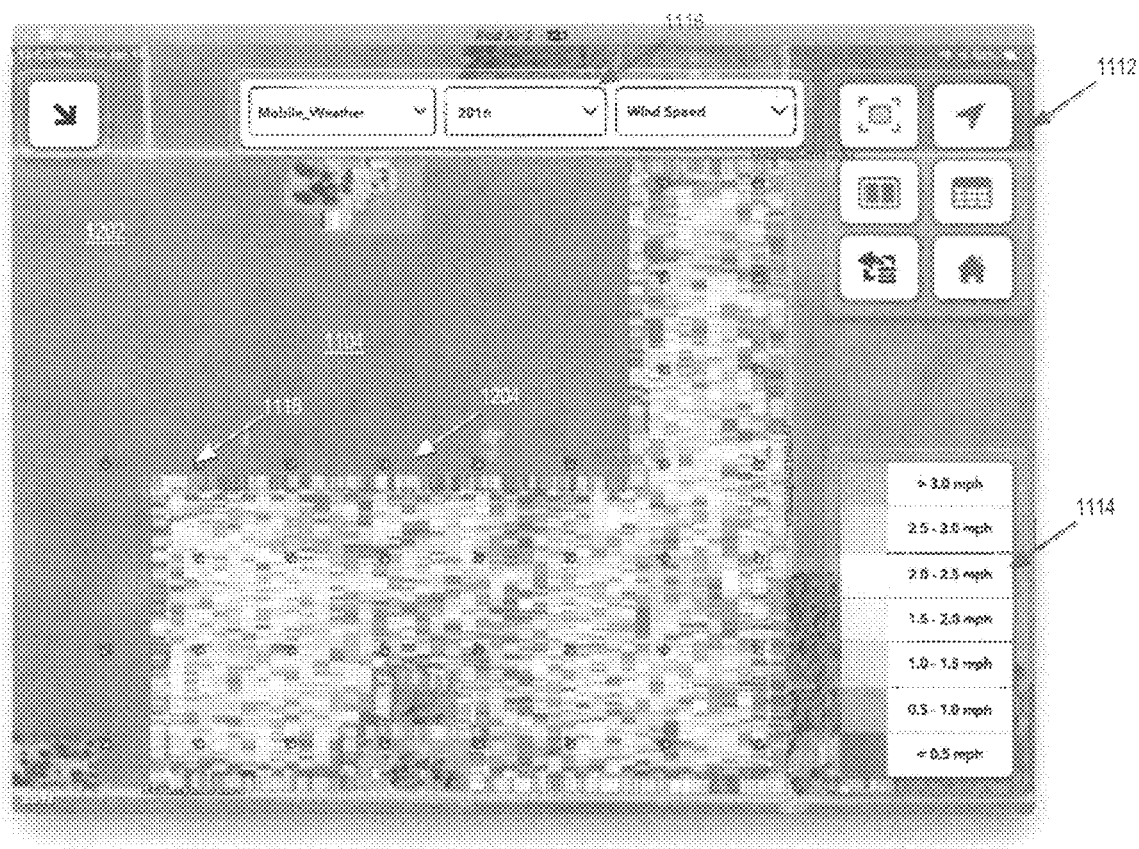
FIG. 12 illustrates an example graphical user interface for a cab computer showing a map of wind speeds at the time of application of a product across an entire field, generated after the application or operation is over.

Referring again to FIG. 10, optionally, after starting execution, at step 1020 an input or command from an operator may instruct the process to generate and display a wind map for conditions at the time of the operation of the apparatus. FIG. 12 illustrates an example graphical user interface for a cab computer showing a map of wind speeds at the time of application of a product across an entire field, generated after the application or operation is over. In an embodiment, a graphical user interface 1202 comprises a wind map 1204 consisting of a plurality of concatenated polygons of different colors which collectively represent all passes or areas of coverage of a particular agricultural operation in the field 1104. Each individual colored polygon within wind map 1204 represents a wind speed that was measured in real time at the time that the apparatus 702 traversed the portion of the field 1104 represented by the polygon. In an embodiment, colors of polygons in the wind map are selected based upon and correlated to color values and wind speed values shown in wind speed legend 1114. Particular shades or colors representing wind speed as shown on the map may indicate wind speeds falling within a certain range of wind speed values, the range being explained by the wind speed legend 1114. For example, a certain section of a field experiencing insignificant amounts of wind may be shown in a green color to indicate the acceptability of working conditions at the portion of the field. Another portion of the field may be shown in a red color to indicate inefficient or unacceptable wind conditions. The colors or shapes of polygons may change in real-time as wind conditions change in a field. For example, as wind speeds increase, the agricultural intelligence computer system may determine that a portion of the field has become unworkable and change the color of that field to red. As an additional example, the portion of the field have a corresponding polygon altered to encompass an adjacent portion of the field which is experiencing similar conditions. Furthermore, interface 1202 comprises a plurality of wind direction indicators 1118 that indicate the wind direction, in terms of compass heading, that was measured in real time at the time that the apparatus 702 traversed the portion of the field 1104 represented by the polygons closest to the wind direction indicators. In an embodiment, wind direction indicators may be spaced apart in the interface 1202 based upon times at which wind direction values were received from weather stations 706. Alternatively, wind direction indicators may be shown only at points where the measured wind direction value represented a material change in comparison to the most recently previously measured wind direction value. The threshold value used to represent a material change may vary in different embodiments; an example is that a 5-degree difference in compass heading of wind direction might result in displaying a new wind direction indicator in the display.

With the display of FIG. 12, it is possible for an operator, supervisor, or another automated program or system to rapidly determine the average wind speed during an operation and/or what proportion of a field was covered during acceptable wind conditions in terms of speed and direction. For example, the cab computer 115 or a separate computer or program could be programmed to inspect the data values forming a basis of wind map 1204 to determine what proportion of the field was covered within the parameters of a particular spray product and/or to identify zones or regions of the field that may have received excess product or insufficient product.

3.3 Automatically Monitoring Effectiveness of Operations

Figure 13:
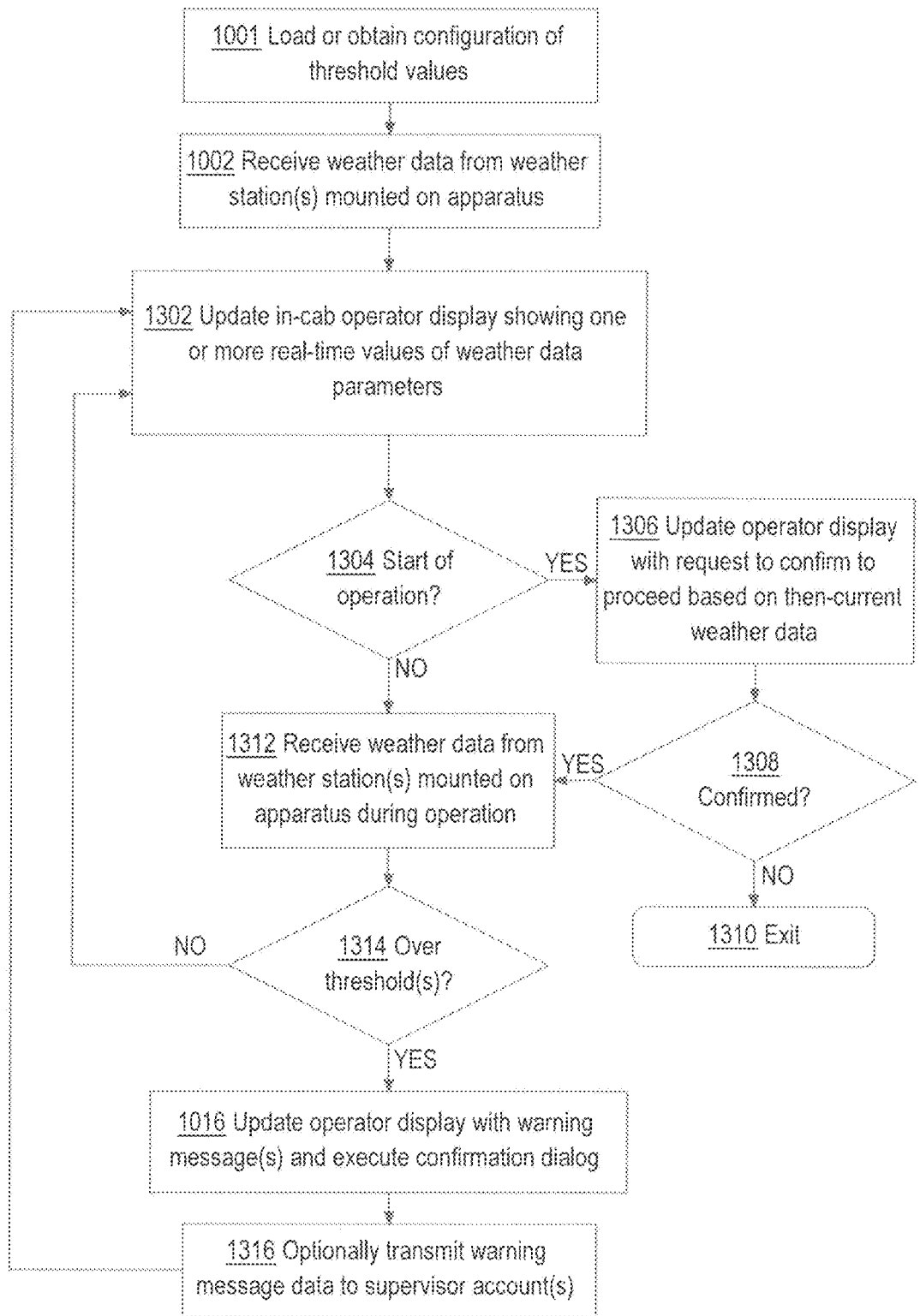
FIG. 13 illustrates an example computer-implemented process of generating in-cab warning messages in response to determining that localized real-time weather conditions are outside thresholds associated with products or operations.

FIG. 13 illustrates an example computer-implemented process of generating in-cab warning messages in response to determining that localized real-time weather conditions are outside thresholds associated with products or operations. In an embodiment, in the process of FIG. 13, steps 1001, 1002 are executed as described herein for FIG. 10. At step 1302, the process updates an in-cab operator display showing one or more real-time values of weather data parameters. The display of FIG. 11 may be used for this purpose. The result of step 1302 is that a display like that of FIG. 11 is updated to show the then-current values of temperature, wind speed, wind direction and the like at the apparatus 702 at the time that an agricultural operation is starting or underway.

At step 1304, the process tests whether an agricultural operation is starting. The test of step 1304 may be TRUE, for example, when the cab computer 115 has started or rebooted, or when operator input indicates that a new spraying operation or other agricultural operation is starting. Step 1304 also may be TRUE if the state of memory of the cab computer 115 indicates that values indicating the progress of an agricultural operation are not stored or are stale. If step 1304 is TRUE, then at step 1306, the operator display is updated with a request to confirm that the operation should proceed based on the then-current weather data. For example, a dialog box or prompt may be superimposed over the display of FIG. 11 to prompt the operator to review the weather parameters and confirm that they are acceptable for an agricultural operation that is to start. Operator input may indicate confirmation or cancellation, as tested at step 1308. If cancellation input is given, then the process exits at step 1310.

If confirmation input is received at step 1308, or if the test of step 1304 is FALSE, then at step 1312, the process receives weather data from weather stations mounted on the apparatus during operation. The processes described herein for FIG. 7, FIG. 8, FIG. 9 may be used to obtain weather data during operation of the apparatus 702.

At step 1314, the process compares values of discrete parameters of the weather data and/or proximity data to the threshold values that were obtained at step 1312, and the process tests whether any of the parameters exceed any of the threshold values. If so, then at step 1016 the operator display is updated with one or more warning messages indicating that thresholds have been exceeded, or similar messages, as described for FIG. 10. While generating warning messages to an operator based upon a threshold-crossing algorithm is shown as an example, in other embodiments, comparisons other than threshold-crossing may be used to determine when a warning message should be generated. For example, the process could be programmed with rules specifying multiple comparisons of related parameters using any combination of arithmetic operators for the comparisons, IF . . . THEN relationships and so forth. Step 1016 of FIG. 13 also may include executing a confirmation dialog in which the operator is prompted to confirm that the agricultural operation should proceed, or cancel the operation due to adverse weather conditions.

At step 1316, the process optionally transmits warning message data to one or more supervisor accounts, other processes or systems. Wireless transmission from cab computer 115 to cloud 902 may be used or more localized wireless transmission to another computer associated with the other accounts may be used, such as a field manager location near the current field at which the operation is occurring. Step 1316 may be programmed to permit a grower, farm or field manager, or other supervisor or account to receive data indicating that step 1314 resulted in a warning message at step 1016. This step may permit a remotely located supervisor to further evaluate whether operations should proceed and to provide instructions by radio, cellular radiotelephone or other means to instruct the operator of the apparatus 702 whether to continue, modify the operation or terminate the operation and/or to scout or inspect the field or affected area for possible reapplication of product. Reports and summaries may be generated to facilitate checks of application quality, to understand which applications and fields were most affected and which operators were applying products in the wrong conditions.

3.4 Automated Creation of Field Buffer Zones

Figure 14A:
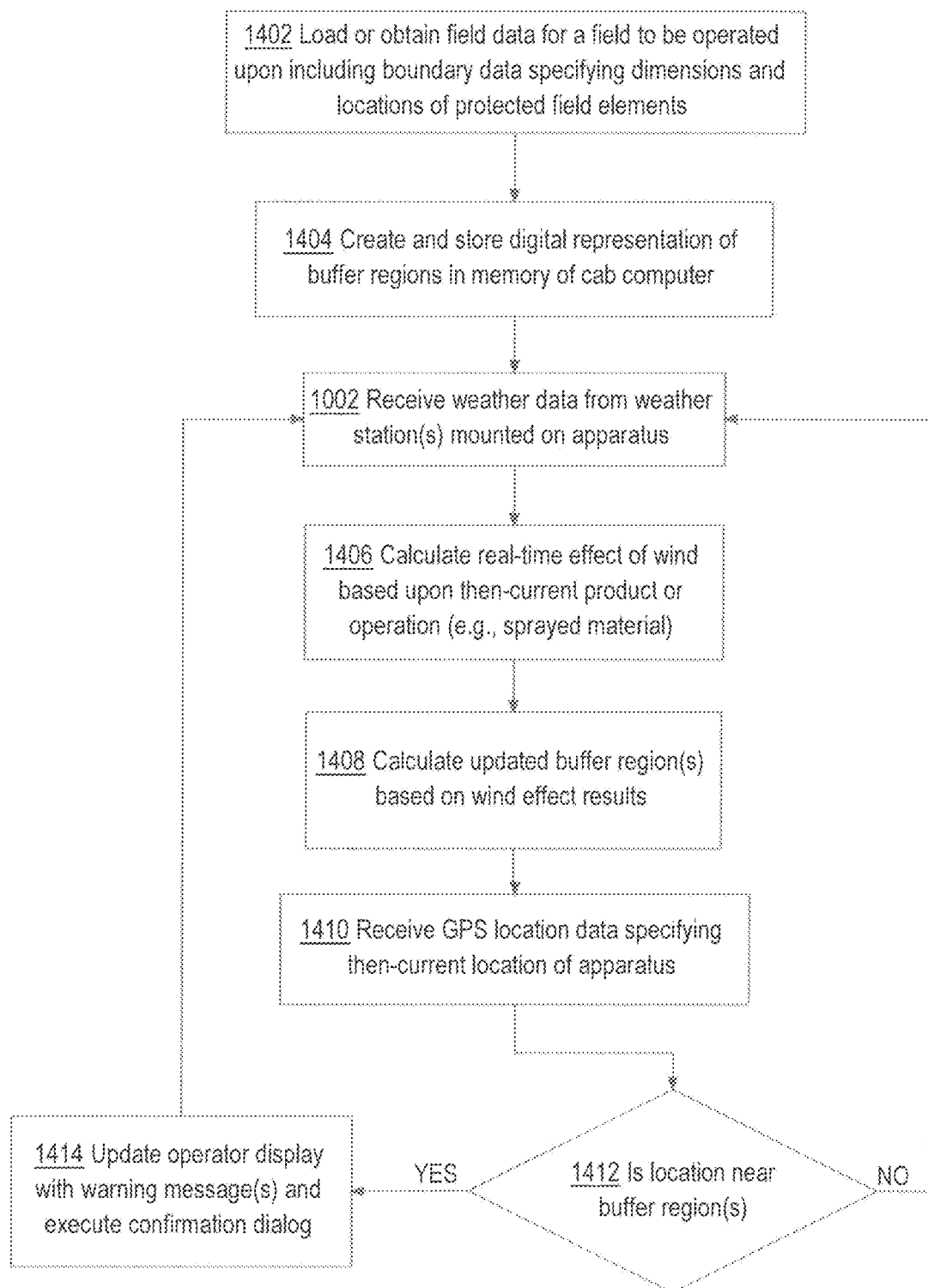
FIG. 14A illustrates an example computer-implemented process of automatically determining dimensions of field buffer regions during agricultural operations based on localized real-time weather conditions.
Figure 14B:
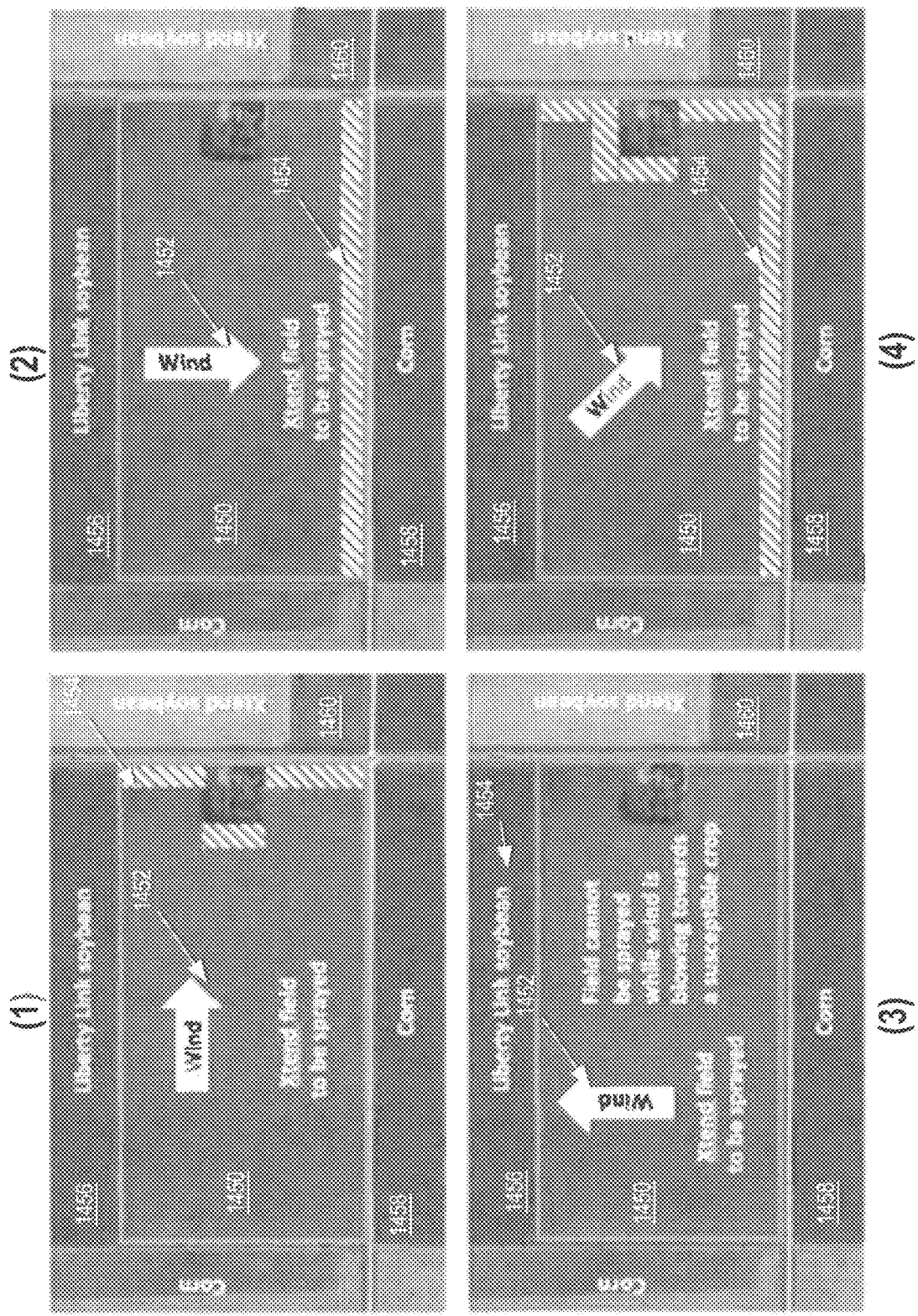
FIG. 14B illustrates an example graphical user interface for a cab computer showing four (4) different dynamically generated buffer zones in sub views labeled (1), (2), (3), (4).

FIG. 14A illustrates an example computer-implemented process of automatically determining dimensions of field buffer regions during agricultural operations based on localized real-time weather conditions. FIG. 14B illustrates an example graphical user interface for a cab computer showing four (4) different dynamically generated buffer zones in sub views labeled (1), (2), (3), (4). Referring first to FIG. 14A, in an embodiment, at step 1402 the process loads or obtains field data for a field to be operated upon including boundary data specifying dimensions and locations of protected field elements. Field data may specify field dimensions as a set of points and edges, as well as one or more protected field elements in terms of points and edges to permit the cab computer to create an in-memory representation of the geometry of a field and the protected elements. Examples of protected elements include adjacent fields or regions of crops that should be protected from spray drift or other effects. "Region," in this context, may include field management zones that have been previously defined using cab computer 115 and/or other software applications of the cab computer or cloud 902 for other purposes.

Step 1402 also may comprise obtaining, from operator input, a stored configuration file, database or a query to a cloud-based resource, information about an operation to be conducted or a product to be applied using the agricultural apparatus 702. For example, step 1402 can include retrieving or obtaining product label data for sprayed chemicals that indicates or represents allowable wind speed parameters that avoid drift of the product.

At step 1404, the process creates and stores a digital representation of buffer regions in the memory of the cab computer. In some embodiments, step 1404 may include generating an displaying a graphical user interface display of the type seen in FIG. 14B, to enable operator visualization of the buffer regions. Referring now to FIG. 14B, in various embodiments represented by views (1), (2), (3), (4), a field 1450 may be experiencing wind direction 1452 as measured at apparatus 702 (not shown in FIG. 14B). Buffer regions 1454 may be defined in stored data. Adjacent fields 1456, 1458, 1460 may require protection via buffer zones.

Steps 1002, 1406, 1408, 1410, 1412, 1414 represent a loop that may be executed continuously in real-time as agricultural apparatus 702 is conducting an operation in a field. At step 1002, the process receives weather data from one or more weather stations mounted on the agricultural apparatus. Step 1002 may be executed as described for FIG. 10 and using the techniques of FIG. 7, FIG. 8, FIG. 9. At step 1406, the process calculates a real-time effect of then-current wind conditions, in terms of speed and direction, on application of the then-current product or operation such as sprayed material. At step 1408, the process may calculate one or more updated buffer regions based upon the results of step 1406. For example, step 1408 may comprise enlarging or reducing the size of a previously defined buffer region based upon the effect calculated at step 1406; high wind speed could require a much larger buffer region to avoid drift of product into the buffer region based on the then-current GPS position of the apparatus 702, and low wind speed could permit observing a smaller buffer region.

At step 1410, GPS location data specifying a then-current location of the apparatus 702 is received. At step 1412, the process tests whether the current location of the apparatus 702 is near one or more of the buffer region(s) that have been defined in memory. If so, then at step 1414 the operator display is updated with one or more warning messages and a confirmation dialog is initiated. The operator display may be updated with a warning message indicating that the apparatus is approaching or too close to one of the buffer regions and to request confirmation whether to continue or change the direction of the apparatus 702 to avoid entering or approaching a buffer region.

In this manner, localized real-time weather data obtained on agricultural apparatus 702 can be used to direct the apparatus to avoid conducting agricultural operations, including but not limited to spraying, in locations that will have adverse effects on the operations and/or crops in the current field or other fields, regions or zones.

3.5 Automated Generation of Regulatory Reports

FIG. 15 illustrates an example computer-implemented process of automatically generating regulatory reports relating to completed agricultural operations.

At step 1502, the process queries one or more databases coupled to or managed by the cab computer 115 or cloud 902 to obtain operational parameters relating to an agricultural operation. In one embodiment, operational parameters comprise an average speed, total area, applicator name and license number for each sprayer that is associated with apparatus 702 or with a field or grower. In other embodiments, other operational parameters may be obtained or used. For example, other operational parameters may include specifications for commercial product applications, user input, or cloud-based input. Specifications for commercial product applications may include specified instructions or metrics for commercial treatment products, such as a recommended application volume of crop products, a viscosity of liquids to be used in the sprayers disclosed above, or a wind susceptibility metric associated with the product in some embodiments. User input parameters may include a manual speed of an implement operated by a human user, a time period for treatment to commence or other constraints on a treatment operation undertaken by the human user in some embodiments. Cloud-based input may include one or more remotely stored metrics related to historical crop or treatment data or additional weather details in some embodiments.

At step 1504, based on databases or log files generated from other processes, the process obtains temperature, wind speed, and wind direction values for the start time and end time of a spray application. The databases or log files may comprise those that are generated as part of the processes of FIG. 10, FIG. 13, FIG. 14A of this disclosure, for example, or any other process that results in persistently storing weather parameter values that have been obtained during the operation of the apparatus 702 in a field. The databases or log files may be associated with cab computer 115 or cloud 902.

At step 1506, a field boundary area is obtained from stored field data and an application area is calculated. Field data may be obtained in the same manner described above for step 1402 of FIG. 14A. At step 1508, a registration number for each material or product is obtained. Registration number data may be obtained as part of the product data that may be retrieved or obtained at step 1402 of FIG. 14A. Or, registration number values may have been persistently stored in memory of the cab computer 115 or cloud 902 using other applications or processes.

At step 1510, a regulatory compliance report is generated and stored at cab computer 115 and/or transmitted to cloud 902.

3.6 Automated Drift Management

FIG. 16 illustrates an integrated data processing system programmed to provide automatic drift control for agricultural apparatus when operating in fields based on local real-time weather data. FIG. 16 represents an integrated approach in which real-time, localized weather data obtained at apparatus 702 during operations in agricultural fields is integrated with other data that has been previously obtained and stored in connection with other program applications or processes.

In an embodiment, as seen in FIG. 16, the agricultural intelligence computer system 130 (FIG. 1) is programmed with drift control instructions 1602 that are capable of integrating a plurality of disparate data values and providing instructions concerning drift control to cab computer 115. In an embodiment, computer system 130 is coupled to or receives crop detail data 1602, field data 1604, surrounding landscape data 1606, protected area data 1608, product label data 1610, and weather forecast data 1612. In various embodiments, crop detail data 1602, field data 1604, surrounding landscape data 1606, protected area data 1608, product label data 1610, and weather forecast data 1612 may be obtained from field data 106 (FIG. 1), external data 110 (FIG. 1) or model and field data repository 160 (FIG. 1). Or, product label data 1610 could be obtained by scanning a QR code on a product package and executing a database query to correlate the QR code to a set of product parameters. The particular location at which this data is stored is not critical provided that computer system 130 can access and retrieve the data. Communication layer 132 facilitates obtaining this data from field data 106, external data 110 or model and field data repository 160.

The techniques herein can yield improved efficiency of agricultural operations, such as improved efficiency in applying sprayed products. The techniques herein also can improve regulatory compliance by providing equipment operators with information about how to avoid conducting operations outside the parameters recommended by product manufacturers.

4. PRACTICAL APPLICATIONS

In an embodiment, the optimization of field treatments based on received field condition data is implemented through an agronomic or agricultural implement. The agricultural implement may traverse a field applying treatments to crops in a particular manner which is altered based on the field condition data. For example, the agricultural intelligence computer system may be installed and executed at an agricultural implement such as a pesticide spraying vehicle, the pesticide spraying vehicle being designed to traversed a field while spraying pesticides on a crop canopy. Collected field condition data may be received, stored, and used in a manner which improves operation of the spraying vehicle over the standard method of traversing a field in a simple pattern and guessing at the proper application of pesticide. For example, the agricultural intelligence computer system may use a variety of collected real-time data, including weather, GPS, proximity and historical data, then create or alter existing recommended operations for the spraying vehicle, such as a field traversal path, a spray angle, a spray amount, or a total cease in operation of the vehicle based on the detection of conditions hazardous to the field.

In an embodiment, the agricultural intelligence computer system uses received GPS data to determine the real-time location of an agricultural implement in a field. In various further embodiments, the agricultural intelligence computer system comprises a display capable of showing an indication of the location of an agricultural implement in a field in real-time. The indicator of the implement may be superimposed over an existing map of the field to show the current and/or previous paths of traversal of the field by the agricultural implement. As a result, an operator utilizing the display of the agricultural intelligence computer system may view current and recent paths of traversal of the field by the agricultural implement and may alter future paths of traversal based on the indication. For example, an operator of a spraying vehicle may view real-time paths of traversal through the field in order to determine that every zone or portion of a crop canopy in a field was or will be subjected to a proper amount of pesticide spray treatment to ensure optimal crop growth. In this way, the agricultural intelligence computer practically applies the embodiments discussed above to eliminate inefficient guessing methods for expected paths of field traversal.

In an embodiment, the agricultural intelligence computer system uses received weather data to optimize treatment procedures for an agricultural implement by determining variances and inaccuracies in perceived field traversal techniques. For example, liquid pesticides transformed into a light mist or spray to be applied to a crop canopy may be particularly sensitive to changes in wind velocity or direction and may affect the manner in which pesticides are applied to a field. In various embodiments, operation of an agricultural implement may be affected by recommendations based on analysis of real-time weather data local to an agricultural implement. For example, a detected increase in "down-wind" velocity may correspond to a greater dispersal of pesticides to a zone of crops downwind of a spraying vehicle. As a result, the agricultural intelligence computer system may determine that a portion of a crop canopy intended to be treated during a particular field traversal will not receive a proper amount of treatment due to the spread of a significant amount of the pesticide "down-wind." As a result, the agricultural intelligence computer system may warn an operator that unfavorable wind conditions exist and further recommend that the operator alter the course of the spraying vehicle to a position farther "up-wind" of the particular crop canopy to ensure a proper application of pesticides to that portion of the crop canopy.

In an embodiment, the agricultural intelligence computer system uses received proximity data to optimize treatment procedures for an agricultural implement by determining the distance of a treatment portion of the agricultural implement to a corresponding part of the field. For example, the agricultural intelligence system may detect that proximity sensors on a spraying vehicle are a certain distance from a crop canopy which will be the subject of a pesticide treatment. Weather conditions may affect the manner in which treatments are applied to a field subject to an error rate based on the proximate distance between a treatment implement and a portion of a field targeted for treatment. For example, the agricultural intelligence system may determine that a certain sprayed pesticide travels three centimeters downwind for each five mile-per-hour gust of wind affecting sprayers positioned one meter above the crop canopy, with an absolute margin of error of four centimeters. Sensors on a spraying vehicle may detect that current weather conditions show five miles-per-hour of wind during spraying procedures, but that the spraying nozzle is within one meter of the crop canopy at the time of spraying. As a result, the agricultural intelligence computer system may determine that conditions are not unfavorable for application of a pesticide and may recommend that an operator proceed with spraying procedures normally.

In various embodiments, the agricultural implement may be any one of a number of vehicles used in crop treatment or facilitation operations. In an embodiment, the implement is a tractor towing equipment throughout a field, the equipment performing treatments on a crop canopy subject to conditions present in the field. For example, the equipment may be a fertilizer-spreading equipment and the efficient application of fertilizer may be based on the relative humidity in a field. In an embodiment, the implement is a baler and the efficiency of the operation of the baler may be dependent on the ability to collect and bale objects in the field based on present weather conditions. For example, the ability to collect and bail crops may be less efficient on windy days than on calm days. In an embodiment, the implement is a combine harvester and the harvest process for certain crops may be affected by the present weather conditions in a field at the time of harvest. For example, harvesting crops may be more efficient on days when the crops have a certain water content which is affected by presence of rain during the harvesting process. In an embodiment, the implement is a plow, and the ability to till soil using the plow is dependent on the present state of weather conditions affecting soil in a field used to plant crops. For example, essential soil nutrients may be more likely to run off of a field when rain is present during the tilling process. In an embodiment, the implement is a planter and the operation of the planter and the ideal conditions for planting crop seeds in a field is dependent on the current weather conditions in the field. For example, a presence of high winds during a planting process may cause more varied seed scatter, affecting future traversal patterns of the field.

5. BENEFITS OF CERTAIN EMBODIMENTS

When considered in light of the specification herein, and its character as a whole, this disclosure is directed to improvements in the weather, positioning, and proximity data, as well as various other types of data, to determine optimal conditions and recommend alterations of treatment procedures based on real-time local conditions. The disclosure is not intended to cover or claim the abstract model of determining and comparing data but rather to the practical application of the use of computers to sense, store, and manipulate real-time local conditions for a field, and alter the manner in which operations or recommendations of operations are sent to an agricultural implement or the operator of an agricultural implement. By accounting for real-time treatment conditions in a field, taken locally at the agricultural implement, the system is additionally able to improve the accuracy, reliability, and usability of treatment models while preventing otherwise unaccountable complications with field treatments due to unstoppable weather changes. Thus, implementation of the invention described herein may have tangible benefits in increased agronomic yield of a crop, reduction in resource expenditure while managing a crop, and/or improvements in the crop itself.

What is claimed is:

1. A computer-implemented method for providing crop treatments based on field conditions, the method comprising:
    receiving and digitally storing, by an agricultural implement in a field, field condition data related to real-time field conditions, from multiple sensors coupled to the agricultural implement, the field condition data comprising real-time weather data and real-time location data local to the agricultural implement;
    updating, based on the field condition data, an electronic display coupled to the agricultural implement to display a digital indication of at least a portion of the field condition data;
    determining, using the field condition data, one or more field condition values representing real-time field conditions local to the agricultural implement, the field condition values including a wind speed;
    comparing the one or more field condition values to one or more corresponding threshold condition values; and
    in response to determining that at least one of the one or more field condition values exceeds a corresponding threshold condition value:
        enlarging or reducing a size of one or more buffer region(s) of the field; and
        updating the electronic display to include a warning message, based on a location of the agricultural implement indicated by the location data relative to the one or more buffer region(s).

2. The method of claim 1, wherein:
    the location data comprises GPS data corresponding to a coordinate location of the agricultural implement; and
    the GPS data is received form one or more GPS sensors of the multiple sensors attached to the agricultural implement.

3. The method of claim 1, wherein:
    the field condition data comprises proximity data corresponding to a distance between a crop canopy and a treatment implement attached to the agricultural implement;
    the one or more field condition values further include the distance between the crop canopy and the treatment implement; and
    the proximity data is received from one or more proximity sensors attached to the agricultural implement.

4. The method of claim 1, further comprising:
    transmitting, using wireless communication protocols, the field condition data related to real-time field conditions to one or more cloud-based servers;
    updating the one or more cloud-based servers to include the field condition data.

5. The method of claim 1, further comprising:
    receiving the one or more threshold condition values;
    storing the one or more threshold condition values at the agricultural implement.

6. The method of claim 1, further comprising:
    displaying, on the electronic display, a map of the field;
    displaying, on the electronic display, in real-time, an indication of movement of the agricultural implement, the indication of movement corresponding to a history of the location of the agricultural implement as it traverses the field;
    updating, on the electronic display, based on the field condition data, the indication of the movement to include an indication of coverage, the indication of coverage corresponding to a history of treatments applied to the field as the agricultural implement traverses the field.

7. The method of claim 1, wherein the one or more field condition values further include a wind direction; and
    wherein the method further comprises displaying, on the electronic display, a wind map, the wind map including the wind speed and the wind direction at a time of operation of the agricultural implement at one or more field locations.

8. The method of claim 1, further comprising:
    determining, based on the field condition data, one or more portions of the field corresponding to zones that have received excess or insufficient treatment;
    displaying, on the electronic display, the determined one or more portions of the field corresponding to zones that have received excess or insufficient treatment.

9. The method of claim 1, further comprising:
    receiving field boundary data corresponding to dimensions of the field;
    defining, based on the field condition data and the field boundary data, the one or more buffer region(s) of the field indicative of where field treatments should not be applied;
    displaying, on the electronic display, the one or more defined determined-field buffer region(s), prior to enlarging or reducing the size of the one or more defined buffer regions; and then
    displaying, on the electronic display, the one or more defined buffer region(s), after enlarging or reducing the size of the one or more defined buffer regions, in response to determining that the at least one of the one or more field condition values exceeds the corresponding threshold condition value.

10. The method of claim 1, further comprising:
    receiving one or more treatment parameters corresponding to specifications for applying a treatment to a field;
    updating the field condition data and the one or more threshold condition values based on the one or more received treatment parameters.

11. The method of claim 1, further comprising:
    determining, from the field condition data and the one or more threshold condition values, one or more automated instructions for operation of the agricultural implement to apply a treatment to the field;
    displaying, by the electronic display, the one or more determined automated instructions to apply a treatment to the field.

12. A crop treatment system for providing improvements in agricultural science by optimizing crop treatments based on field conditions, the system comprising:
- an agricultural implement comprising:
  - an electronic display;
  - a weather sensor, a GPS sensor, and a proximity sensor; and
  - a processor and main memory comprising executable instructions which, when executed by the processor, cause the processor to perform:
    - receiving and digitally storing, by the agricultural implement in a field, field condition data related to real-time field conditions, the field condition data comprising real-time weather data received from the weather sensor, real-time location data received from the GPS sensor, and field proximity data received from the proximity sensor, the field condition data being local to the agricultural implement in the field;
    - updating, based on the field condition data, the electronic display coupled to the agricultural implement to display a digital indication of one or more real-time field conditions associated with the field;
    - determining, using the field condition data, one or more field condition values representing real-time field conditions local to the agricultural implement, the one or more field condition values including a wind speed at the agricultural implement, based on the weather data;
    - comparing the one or more field condition values to one or more corresponding threshold condition values; and
    - in response to determining that at least one of the one or more field condition values exceeds a corresponding threshold condition value:
      - enlarging or reducing a size of one or more buffer region(s) of the field; and
      - updating the electronic display to include a warning message based on a location of the agricultural implement indicated by the location data relative to the one or more buffer region(s).

13. The system of claim 12, further comprising one or more cloud-based servers in communication with the agricultural implement via wireless communication protocols; and
wherein the executable instructions, when executed by the processor, further cause the processor to perform:
- transmitting the field condition data related to real-time field conditions to the one or more cloud-based servers; and
- updating the one or more cloud-based servers to include the field condition data.

14. The system of claim 12, wherein the executable instructions, when executed by the processor, further cause the processor to perform:
- receiving, by the agricultural implement, the one or more threshold condition values; and
- storing the one or more threshold condition values at the agricultural implement.

15. The system of claim 12, wherein the executable instructions, when executed by the processor, further cause the processor to perform:
- displaying, on the electronic display, a map of the field;
- displaying, on the electronic display, in real-time, an indication of movement of the agricultural implement, the indication of movement corresponding to a history of the location of the agricultural implement as it traverses the field; and
- updating, on the electronic display, based on the field condition data, the indication of the movement to include an indication of coverage, the indication of coverage corresponding to a history of treatments applied to the field as the agricultural implement traverses the field.

16. The system of claim 12, wherein the executable instructions, when executed by the processor, further cause the processor to perform displaying, on the electronic display, a wind map, the wind map showing the wind speed and a wind direction at a time of operation of the agricultural implement including at least a speed and a direction of wind at one or more field locations.

17. The system of claim 12, wherein the executable instructions, when executed by the processor, further cause the processor to perform:
- determining, based on the field condition data, one or more portions of the field corresponding to zones that have received excess or insufficient treatment;
- displaying, on the electronic display, the determined one or more portions of the field corresponding to zones that have received excess or insufficient treatment.

18. The system of claim 12, wherein the executable instructions, when executed by the processor, further cause the processor to perform:
- receiving, by the agricultural implement, field boundary data corresponding to dimensions of the field;
- defining, based on the field condition data and the field boundary data, the one or more buffer regions corresponding to boundaries where field treatments should not be applied;
- displaying, on the electronic display, the one or more defined buffer regions; and then
- displaying, on the electronic display, the one or more defined buffer region(s), after enlarging or reducing the size of the one or more defined buffer regions, in response to determining that the at least one of the one or more field condition values exceeds the corresponding threshold condition value.

19. The system of claim 12, wherein the executable instructions, when executed by the processor, further cause the processor to perform:
- receiving, by the agricultural implement, one or more treatment parameters corresponding to specifications for applying a treatment to a field;
- updating the field condition data and the one or more threshold condition values based on the received one or more treatment parameters.

20. The system of claim 12, wherein the executable instructions, when executed by the processor, further cause the processor to perform:
- determining, from the field condition data and the one or more threshold condition values, one or more automated instructions for operation of the agricultural implement to apply a treatment to the field;
- displaying, by the electronic display, the one or more determined automated instructions to apply a treatment to the field.

* * * * *